United States Patent Office 3,733,285
Patented May 15, 1973

3,733,285
LIGHTWEIGHT STRUCTURAL COMPOSITIONS USING POLYESTER RESINS
George A. Steffy, Pittsburgh, Pa., assignor to Koppers Company, Inc., Pittsburgh, Pa.
No Drawing. Filed Mar. 2, 1972, Ser. No. 231,408
Int. Cl. C08j 1/30
U.S. Cl. 260—2.5 B     6 Claims

ABSTRACT OF THE DISCLOSURE

There is disclosed a composition comprised of expanded polystyrene particles, a copolymerizable mixture of a polyester resin and monovinyl ether monomer, and a hydraulic binder. Other conventional aggregates, such as sand and the like, may be added to the composition.

FIELD OF THE INVENTION

This invention relates to lightweight structural material and particularly to structural materials which have an initial fluid nature and which can be cast in a mold where the fluid changes to a solid; the low density of the solid being due to a great extent to the use of expanded polystyrene particles as an aggregate in the composition.

BACKGROUND OF THE INVENTION

A castable structure material, such as concrete, that uses expandable polystyrene particles as aggregate has a number of advantageous features in comparison with other types of lightweight concrete. Such features being, for example, low density, thermal insulation, and low moisture absorption. The characteristics of the expandable polystyrene particles which help to provide these desirable features, however, also create problems in the production of such lightweight structural material.

The expanded polystyrene particles are spherical. The particles are, generally, hydrophobic in nature and do not wet readily. The foamed polystyrene particles are expensive in comparison with conventional aggregates such as sand or gravel, or attempts are made to have the density of the expanded particle as low as possible, for example, less than one pound per cubic foot. Consequently, the differences in density and in wetting characteristics of the expanded polystyrene particles in comparison with the other components of cement mix, itself, are so great that the particles tend to agglomerate or to separate from the fluid mix before the mixture can set or cure to its ultimately solid condition. A major problem has been to maintain the mixture homogeneous until the mixture sets or cures to a solid.

Several approaches have been taken heretofore to overcome this problem of maintaining the liquid mixture homogeneous until it cures or sets to a solid phase. Pat. No. 3,272,765 "Lightweight Concrete" for example describes the use of a surface active additive. Pat. No. 3,547,412 "Production of Lightweight Concrete" describes the use of an epoxy resin as an adhesion promoter to secure a bond between the expanded polystyrene particles and the hydraulic binder.

According to Pat. No. 3,547,412, two mixtures are made in two vessels and then the contents of the two vessels are combined and mixed. In one vessel the expanded polystyrene particles are mixed with a dispersion having a concentration of about one part of an epoxy resin to 50 parts of water. In the second vessel a conventional mixture of cement, sand and water is prepared. Then, the contents of the first vessel is emptied into the second vessel. The combined contents are mixed and then cast into final form to cure.

According to Pat. No. 3,272,765, one part of a surface active additive is added to one hundred twenty five parts of water, then one part of a thermoplastic resin of polymeric polynuclear hydrocarbons, is added as an air entraining synergist, is added and mixed. Then the expanded polystyrene beads are added and mixed and then cement and additional water are mixed to form a mixture which is then cast into final form to cure.

The expandable polystyrene particles are small spherical beads having an actual density of about 65 pounds per square foot but having a bulk density about the same as water, i.e., 38 pounds per cubic foot. When these particles are heated, they expand to a volume of 30 to 60 times their original size and the bulk density decreases to one pound per cubic foot or less. This great degree of expansion has the economic advantage in that each pound of the expanded polystyrene can provide a great number of cubic feet of aggregate. The expanded polystyrene particles are so light that the density of the final cured concrete using those particles is low.

Each expanded polystyrene particle is substantially spherical in shape, is free flowing, and has a continuous outer surface. A cross section of a particle shows that it comprised a multitude of extremely fine, discrete, closed cells; i.e., adjacent cells do not interconnect so as to form interconnection voids. As would be expected, separating membranes between these cells are very thin and delicate. The problem presented is that the expanded polystyrene particle is extremely susceptible to attack by solvents. Because of this characteristic, it has been difficult to paint articles made entirely of foamed polystyrene, i.e., when the expandable polystyrene particles have been fused together to form a rigid structure. Pat. No. 3,431,319, "Foamed Polystyrene Articles Coated With an Unsaturated Polyester Resin Having Monovinyl Ether Monomer" describes a coating composition which is capable of being brushed or sprayed onto an article made of foamed polystyrene so as to paint the article without appreciatively attacking the surface of the article. The coating comprises a mixture of an unsaturated polyester resin and an ethylenically unsaturated polymerizable monovinyl ether.

SUMMARY OF THE INVENTION

In accordance with this invention, it has now been discovered that when expandable polystyrene particles are mixed with a copolymerizable mixture including an ethylenically unsaturated polyester resin, and hydraulic binder, the copolymerizable mixture copolymerizes (a) without attacking the expanded polystyrene particles and (b) permits the final mixture to remain homogeneous until the copolymerization reaction takes place and the hydraulic binder does not interfere with the copolymerization of bonder does not interfere with the copolymerization of the mixture and copolymerization does not interfere with the curing of the hydraulic binder. The exact reaction is not known, but there may be additional and advantageous coreactions of the resin and the binder.

The expandable polystyrene for use in this invention is readily available, for example, under the trademark Dylite. A well known method for expanding the expandable polystyrene is described in U.S. Pat. No. 3,023,175. Small particles of expanded polystyrene are desirable for use in this invention but the size of the particles does not appear to be critical.

In accordance with this invention, the expanded polystyrene particles are maintained as a homogeneous part of the concrete mix until the mix changes from a fluid to a solid phase through the action of a resin mixture. The ingredient constituting the major portion, 51–80 percent by weight of the total resin mixture, is an unsaturated polyester such as is formed by the esterification reaction of a carboxylic acid or anhydride with polyhydric alcohols, at least one of these reactants having alpha,beta-ethylenic unsaturation. The ethylenic unsaturation is in the essentially linear chain and is suitable for subsequent reaction. The minor portion 49–20 percent by difference is the mono-vinyl ether set out below either alone or diluted with styrene. The monovinyl ether has the formula:

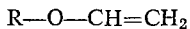

wherein R is an alkyl group having from 8–12 carbon atoms, a hydroxyalkyl group having from 4–12 carbon atoms or a hydroxypolyether group of the formula:

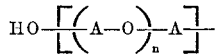

wherein A is an alkylene group having from 2–3 carbon atoms and $n$ is an integer from 1 to 15. Typical ethers include 2-ethylhexyl vinyl ether, decyl vinyl ether, hydroxybutyl ether, hydroxyethyl vinyl ether, hydroxydecyl vinyl ether, and the like. Other useful ethers are the hydroxypolyether substituted vinyl ethers, the hydroxypolyether group having the formula:

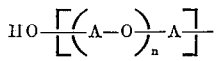

wherein A is an alkylene group having 2–3 carbon atoms and $n$ is an integer from 1 to 15. Examples of such ethers are diethylene glycol monovinyl ether and the higher molecular weight derivatives thereof. The vinyl ether may be diluted with styrene to the extent of 15–20 percent of the total weight of the copolymerizable mixture. In place of styrene, obvious analogous monomers such as vinyltoluene may be used.

Catalysts may be used to control the time necessary for the copolymerization of the unsaturated polyester resin and the ethylenically unsaturated polymerizable material. Catalysts to increase the rate of copolymerization are generally used in an amount of about 0.5 to 2.5 percent by weight of the copolymerizable mixture.

Illustrative catalysts are the various organic peroxides and hydroperoxides, well known in the art, such as benzoyl peroxide, substituted benzoyl peroxides, acetyl peroxide, cyclohexanone peroxide, dicumyl peroxide, methyl ethyl ketone peroxide, and the like. Promoters such as tertiary amines, metal esters and the like may also be used. For example, a mixture of methyl ethyl ketone with cobalt naphthanate, octanoate or linoleate may be used, or to this mixture may be added a second promoter such as dimethylaniline or diethylaniline. Also a mixture of benzoyl peroxide and a dialkylaniline may be used, as may a mixture of cyclohexanone peroxide and manganese naphthanate. Other catalysts such as organic hydroperoxides, for example, cumene hydroperoxide and t-butyl hydroperoxide in conjunction with organic mercaptans or other promoters are useful. The amount and specific catalyst to be used is readily ascertained by one skilled in the art.

The hydraulic binders may be conventional materials such as lime, gypsum, portland cement and the like. The choice of binder is ordinarily determined by the use to be made of the resulting solid structure. For ordinary structural use of the solid, as in concrete blocks, conventional portland cement would be selected. In addition to the binder there may be conventional mineral aggregates such as sand, limestone, quartz and the like. Water, of course, is essential to the chemistry of cement to satisfy the requirements of cement hydration. The water to cement ratio may be conventional. The ratio of hydraulic binder to aggregate and to expandable polystyrene particles also may vary widely depending on the use to be made of the resulting lightweight solid. The expandable polystyrene particles may, for example, comprise from 25 to 95 percent of the volume of the resulting solid product.

The resin mixture and the expanded polystyrene particles are mixed. If desired the resin mixture, as an aqueous dispersion, may be used to form the mixture with the expanded polystyrene particles. The mixing of the resin mixture and the expanded polystyrene particles is continued until the expanded polystyrene particles appear to be well covered with the resin mixture.

After the expanded polystyrene particles have been mixed with the resin mixture, the mixture of hydraulic binder and aggregate is added and the mixing continued until the desired fluid consistency of slurry or paste is reached. The mixture is then cast in a mold of desired shape and permitted to cure to a solid.

The invention will be illustrated further by the following example where unless otherwise indicated the parts are parts by weight.

As an illustration of a composition having a short pot life, i.e., a short time before the composition changes to a solid state, a mixture is made of 10 parts of diethylene glycol monovinyl ether, 20 parts of styrene and 70 parts of the polyester resin (prepared from 1 mole of maleic anhydride, 1 mole of phthalic anhydride, and 2.2 moles of ethylene glycol). To this mixture was then added 0.35 parts cobalt naphthate and 1.5 parts of methyl ethyl ketone peroxide. Thereafter, about 0.2 part of a colloidal silica (Cab-O-sil) is added as a thixotropic agent. To this mixture was then added five times the bulk volume of expanded polystyrene bead particles that have a bulk density of about one pound per cubic foot. The particles were mixed with the resin mixture until the particles appeared to be substantially coated with resin mixture.

At the same time a mixture was made of the hydraulic binder and water. To this end 5000 parts of portland cement were mixed with 2000 parts of water.

The two mixtures, the resin and bead mixture and the hydraulic binder mixture, were mixed. The mixture was then poured into a form in the nature of a block and permitted to cure. The mixture, in accordance with this formulation, sets rapidly, that is, has short pot-life. The resulting solid was a strong lightweight structure.

An advantage of this invention is that the operator is given a wide latitude in the selection of the catalyst and the amount of water. Thus, the compositions can vary widely to suit ultimate needs and production conditions. For example, in the above formulation 2.0 parts of benzoyl peroxide and 0.75 part of methyl ethyl ketone peroxide may be substituted for the cobalt naphthate and the methyl ethyl ketone to provide a composition which will set up only slowly. The setting of this composition, of course, can be made more rapid when heat is applied, especially when the heat reaches about 160° F. The length of time of the pot-life can additionally be controlled by, for example, through the use of external heat and through control of the amount of water used.

To the mixture, which is to be changed to the solid phase, may be incorporated conventionally used additives for developing especial characteristics, such additives, for example as pigments, fire retardant agents, and the like. Such additives are, of course, well known in the art.

A further advantage of the invention is that the novel structure can be prepared under substantially anhydrous conditions. No water need be used with the cement if such be desired. As a result, the composition becomes a mineral extended resinous binder for expandable polystyrene particles. As an example of the practice of this invention without the use of water, 1 pound of expandable polystyrene beads (Dylite) was expanded to a bulk density of 1 pound per cubic foot. These beads were placed in a mixer, the mixer started and 100 cubic centimeters or a resin mixture comprised of 10 cubic centimeters of diethylene glycol monovinyl ether, 20 cubic centimeters of styrene, and 70 cubic centimeters of a polyester resin (prepared from 1 mole maleic anhydride, 1 mole phthalic anhydride, and 2.2 moles of ethylene glycol). Mixing was continued and when the beads appeared to be coated with the resin mixture, about ⅓ of a bag (31 pounds) of cement was added to the mixture and the mixing continued until the beads appeared to be coated with the cement. Resin mixture appears to wet through the cement and enables the cement to stick to the beads. Thereafter, 3 cubic centimeters of a catalytic mixture comprised of 2 cubic centimeters of benzoyl peroxide and 1 cubic centimeter of methyl ethyl ketone peroxide was added and the mixing continued for a few minutes. The volume of the resulting composition was about 1 cubic foot. The resulting mixture was trowled onto a flat surface which had been sprayed with a conventional mold release composition to form on the surface a layer having a thickness of about 2 inches. The composition was allowed to cure into a structural slab.

What is claimed is:

1. A lightweight structural composition comprised of
   (a) inorganic hydraulic cement,
   (b) expanded styrene polymer particles, and
   (c) a curable polyester resin mixture that is compatible with said cement and does not attack said polymer particles and that comprises from
      (i) 51–80 percent by weight of an unsaturated polyester that has been formed by the esterification reaction of a carboxylic acid or anhydride with polyhydric alcohols, at least one of which reactant has alpha,beta-ethylene unsaturation, and
      (ii) 49–80 percent of a monovinyl ether having the formula
         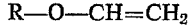
         R—O—CH=CH$_2$
      wherein R is an alkyl group having from 8–12 carbon atoms, a hydroxyalkyl group having from 4–12 carbon atoms or a hydroxypolyether group of the formula
         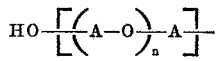
         $HO-\left[\left(A-O\right)_n-A\right]-$
      wherein A is an alkylene group having from 2–3 carbon atoms and $n$ is an interger from 1 to 15.

2. The composition of claim 1 including water.
3. The composition of claim 1 including additives for controlling the color of the composition.
4. The composition of claim 1 wherein the monovinyl ther is diluted with styrene to the extent of 15–20 percent of the total weight of the resin mixure.
5. The composiion of claim 1 including a catalyst for the curing of said resin.
6. A structural composition comprised of:
   (1) a resin mixture of
      (a) 10 parts by weight of diethylene glycol monovinyl ether
      (b) 20 parts by weight of styrene, and
      (c) 70 parts by weight of an unsaturated polyester resin
   (2) a catalytic amount of a mixture of
      (a) cobalt napththalate and
      (b) methyl ethyl ketone peroxide
   (3) expanded polystyrene particles to the extent of five times bulk volume of said resin mixture
   (4) 5,000 parts by weight of inorganic hydraulic cement, and
   (5) 2,000 parts by weight of water.

References Cited

UNITED STATES PATENTS

| | | | |
|---|---|---|---|
| 3,547,412 | 12/1970 | Klages | 259—148 |
| 2,806,509 | 9/1957 | Bozzacco et al. | 260—2.5 B |
| 3,198,758 | 7/1965 | Donnelly | 260—2.5 B |

JOHN C. BLEUTGE, Primary Examiner

M. FOELAK, Assistant Examiner

U.S. Cl. X.R.

260—29.6 S, 40 R, 862